E. P. WOODS & D. SHERWOOD.

Egg-Stand and Boiler.

No. 6,632. Reissued Sept. 7, 1875.

Witnesses:

John E. Crane

Horace F. Slocum

Inventor:

Edward P. Woods

Daniel Sherwood

N. PETERS, PHOTO-LITHOGRAPHER, WASHINGTON, D. C.

UNITED STATES PATENT OFFICE.

EDWARD P. WOODS AND DANIEL SHERWOOD, OF LOWELL, MASSACHUSETTS, ASSIGNORS TO THEMSELVES AND CYRUS H. LATHAM.

IMPROVEMENT IN EGG STANDS AND BOILERS.

Specification forming part of Letters Patent No. 70,769, dated November 12, 1867; reissue No. 5,269, dated February 4, 1873; reissue No. 6,632, dated September 7, 1875; application filed December 10, 1874.

*To all whom it may concern:*

Be it known that we, EDWARD P. WOODS and DANIEL SHERWOOD, both of Lowell, in the county of Middlesex and State of Massachusetts, have invented certain new and useful Improvements in the Construction of Wire Stands or Holders, of which the following is a specification:

Our invention relates to stands or holders of plain and twisted wire; and consists in the construction of the handle, and combination of the parts of the stand, so as to secure strength, ornament, and a neat and durable union of the wires.

Figure 1:
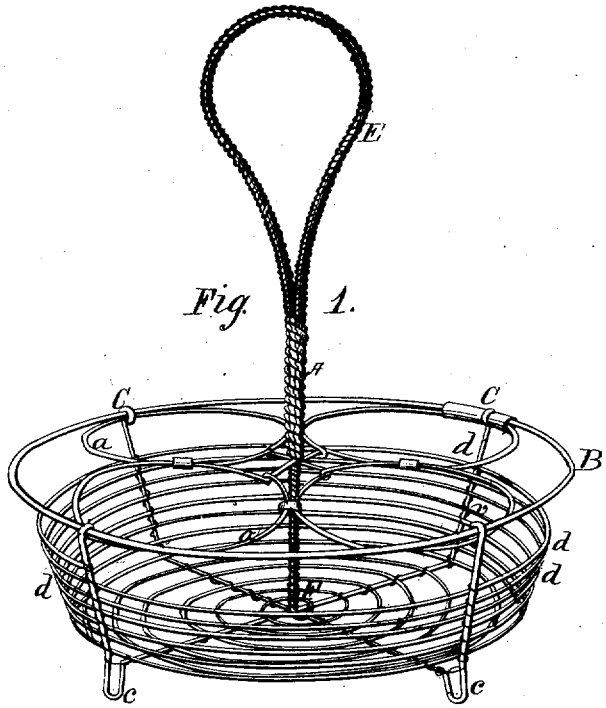
Figure 2:
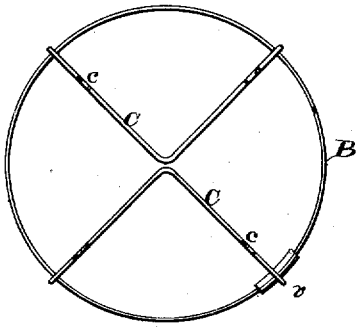
Figure 5:
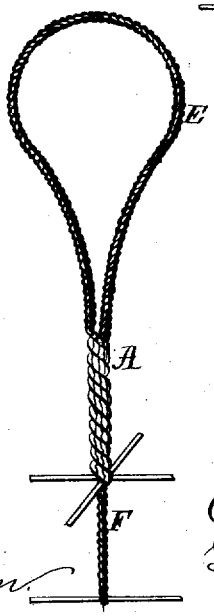
Figure 3:
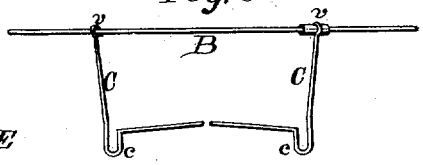
Figure 4:
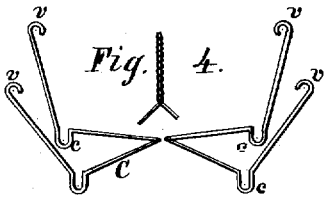

Figure 1 is a perspective view of a stand or holder. Fig. 2 is a top view of its circumferential ring and radiating ribs attached thereto. Fig. 3 is a side view of the same, showing the feet of the stand. Fig. 4 is a perspective view of the radiating ribs, showing how they are united at the center of the holder to each other, and the central supporting stem. Fig. 5 is a detached elevation of the compound twisted shank, with its loop and the separated strands at the proper point to form the holding-rings.

We first make the ring B of the size of the outer circumference of the holder, and join its ends together, as shown in Fig. 2. The ribs C are then formed, as shown in Figs. 2, 3, and 4, and united to the ring B, to compose the frame. These ribs are doubled at the proper point, to form the feet *c c* of the stand. At the point where the ribs unite in the center of the stand an extension of the handle, in the form of a stem, F, of two twisted wires, is brought down to the ribs, and the wires are either separated and twisted around the ribs or soldered thereto, thus binding them and the stem firmly and neatly together, and also uniting the egg-rings *a* to the bottom of the stand. A continuous spiral, *d d*, is also attached to the ribs C by an interlacing of fine wire around them and the ribs. In the drawings the continuous spiral is represented as formed of a single wire, which is shaped on a machine described in the Letters Patent granted to us November 12, 1867, No. 70,770. After the spiral has been formed on the disk of this machine, the ribs C are laced to the spiral by means of proper slots in the disk, which permit it to be done. The ring B, ribs C, and continuous spiral *d*, when united substantially as described, serve to form a solid frame for supporting the rings of the holder, which are intended to receive the articles desired. The rings *a* are connected together by encircling clasps or binders, and they are connected to the ring B by the eyes or loops at the top of each rib C, as shown. The handle of the holder is composed of three wires twisted together into a strand, E, and doubled at the center of the strand, to form a loop at the upper end of the handle. This loop is exceedingly convenient to lift the stand by, and being made of twisted wire, is very strong, ornamental, and also cheaply made.

Below the handle-loop the ends of the twisted strand E are brought together and retwisted into a compound twist, to form a large stem or shank, A, down to the rings *a a*. In this process of retwisting the strands E the wires of which they are composed are at each turn of the compound twist bowed or thrown away from each other, so that they do not abut against and support one another, as in the original strands, and considerable cavities or interstices occur between the separate wires which form the compound twisted shank A.

The shank A, by reason of the wires of the strand E overlying and underlying each other, also has numerous cavities or interstices within it between its strands, which abut against each other upon certain convex tangential points, separated in proportion to the length of twist of the strands. In this condition the wires and strands of the shank A are liable to move or play slightly against each other when strains are applied to it, and the shank possesses considerable elasticity. To render it suitable for our purpose, its wires and strands are then soldered together, at and between their internal tangential points, and its interstices are filled and cemented with metal by dipping it, either separately or with the rest of the holder, in a bath of molten metal. When allowed to cool, the compound twisted shank A thus becomes a homogeneous structure of great rigidity, being both new, useful, and ornamental in a high degree. The wires of the shank A are separated at the rings *a a*, and one of them is used to form each of these rings, thus easily, cheaply, and firmly uniting the rings *a* to the shank.

At the points where the rings *a* touch the ring B one of the ribs C is bent at its ends around each ring *a* and the ring B, thus uniting the rings *a* and the ribs C together, as well as to the ring B. Below the rings *a* there is a stem or support, F, uniting them to the ribs C and base of the stand. This stem F is composed of two of the wires which compose the shank A twisted together. At its lower end the wires which form the stem F are bent around the ribs C at the junction of the latter, and of these, with the lower end of the stem or the parts, are soldered together, thus forming a firm union of the parts, as shown.

We do not claim, broadly, the combination of the compound twisted handle with the stand, as that is the subject of another patent.

What we claim as our invention, and desire to secure, is—

1. The combination of the wire ring B, the ribs C having feet *c*, and the continuous spiral *d*, substantially as described.

2. The combination of the wire rings *a a* with the central supporting-stem F, substantially as described, supporting them upon the base of the holder.

3. The combination of the wire ring B, the wire rings *a a*, and the central supporting-stem F, substantially as described, the rings *a a*, connected together by encircling clasps or binders, and to the ring B by loops at the top end of each rib C.

4. The combination of the wire rings *a a*, the central supporting-stem F, and the ribs C, substantially as described.

5. The compound twisted wire shank A, having its wires and strands E soldered or cemented together at their internal tangential points, substantially as described.

6. The wire handle of the stand, provided with a loop at its upper end, formed of the twisted wire strand E, substantially as described.

7. The rings *a*, constructed each of a single wire, substantially as described, said wire being led from the shank, bent into proper form, and united to itself at or near its junction with the shank.

8. The combination of the ribs C with each other and with the central wire stem F, by the wires of the latter binding them together, substantially as described.

EDWARD P. WOODS.
DANIEL SHERWOOD.

Witnesses:
HORACE F. SLOCUM,
JOHN E. CRANE.